United States Patent
Matsumoto et al.

(10) Patent No.: US 6,786,107 B2
(45) Date of Patent: Sep. 7, 2004

(54) CONSTANT-MESH TRANSMISSION

(75) Inventors: Shinya Matsumoto, Saitama (JP);
Yoshiaki Tsukada, Saitama (JP);
Kazuhiko Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/183,682

(22) Filed: Jun. 28, 2002

(65) Prior Publication Data
US 2003/0024335 A1 Feb. 6, 2003

(30) Foreign Application Priority Data

Jul. 31, 2001 (JP) ........................................ 2001-230979

(51) Int. Cl.$^7$ ................................................. F16H 3/38
(52) U.S. Cl. .......................... 74/339; 74/333; 74/344; 192/53.36
(58) Field of Search .......................... 74/332, 333, 340, 74/344, 345, 352, 355, 339; 192/53.3, 53.36, 53.34

(56) References Cited

U.S. PATENT DOCUMENTS

| | | | | |
|---|---|---|---|---|
| 1,730,362 A | * | 10/1929 | Gaylord ..................... | 74/339 X |
| 1,982,769 A | * | 12/1934 | Thompson ................. | 74/339 X |
| 2,041,445 A | * | 5/1936 | Warren .................... | 192/53.3 X |
| 2,113,709 A | * | 4/1938 | Peterson ................... | 192/53.36 |
| 2,238,370 A | * | 4/1941 | Peterson ...................... | 74/333 |
| 2,285,106 A | * | 6/1942 | Bixby et al. ......... | 192/53.36 X |
| RE29,601 E | * | 4/1978 | Richards ...................... | 74/339 |
| 5,546,823 A | * | 8/1996 | Stine et al. ............... | 74/333 X |
| 6,109,128 A | * | 8/2000 | Mazet ......................... | 74/339 |

FOREIGN PATENT DOCUMENTS

| | | | | |
|---|---|---|---|---|
| DE | 4224268 | * | 1/1994 | .................. 74/339 |
| EP | 492832 | * | 7/1992 | .................. 74/339 |

* cited by examiner

*Primary Examiner*—Ha Ho
(74) *Attorney, Agent, or Firm*—Birch, Stewart, Kolasch & Birch, LLP (57) ABSTRACT

A constant-mesh transmission having a synchronizing mechanism, the synchronizing mechanism including a fifth gear which acts as a shifter so as to rotate integrally with a counter shift and movably in the axial direction, a recess formed in a first gear, and a synchronizer ring. A first connection spline formed in the outer circumferential wall face of the recess and a first synchronization spline formed in the outer circumferential face of the synchronizer ring have a predetermined overlap portion, whereby they overlap partly in the axial direction. In the fifth gear, a second connection spline meshes with the first connection spline and a second synchronization spline presses the first synchronization spline in the axial direction to make the synchronizer ring and the first gear come into frictional engagement with each other.

20 Claims, 10 Drawing Sheets

PRIOR ART

PRIOR ART

CONSTANT-MESH TRANSMISSION

CROSS-REFERENCE TO RELATED APPLICATIONS

The present application claims priority under 35 U.S.C. §119 to Japanese application No. 2001-230979, filed Jul. 31, 2001, the entire contents of which by incorporated by reference.

BACKGROUND OF THE INVENTION

1. Field of the Invention

The present invention relates to a constant-mesh transmission, such as a gear-type transmission mounted on a vehicle.

2. Description of Background Art

Figure 9:
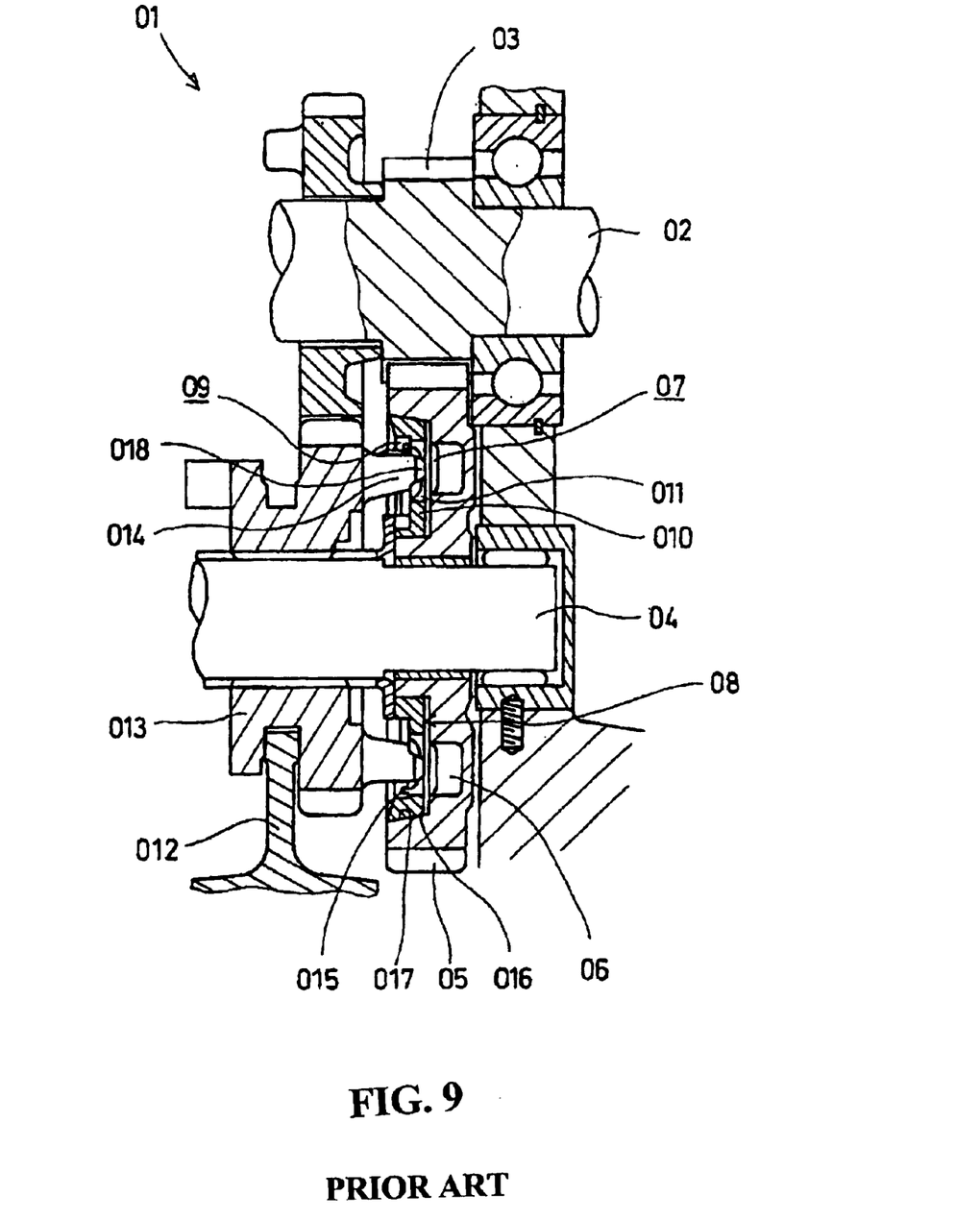
FIG. 9 is a cross section of a main portion of a conventional constant-mesh transmission.
Figure 10A:
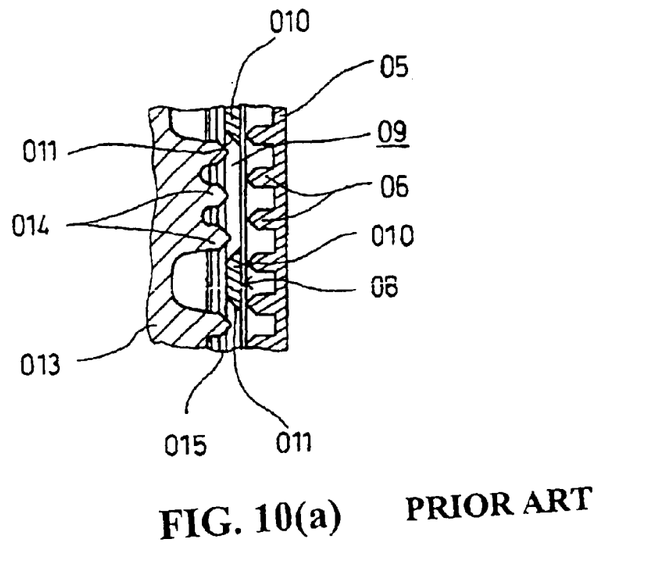
FIGS. 10(A) and 10(B) are diagrams illustrating the operation of a synchronizing mechanism of the conventional constant-mesh transmission of FIG. 9.
Figure 10B:
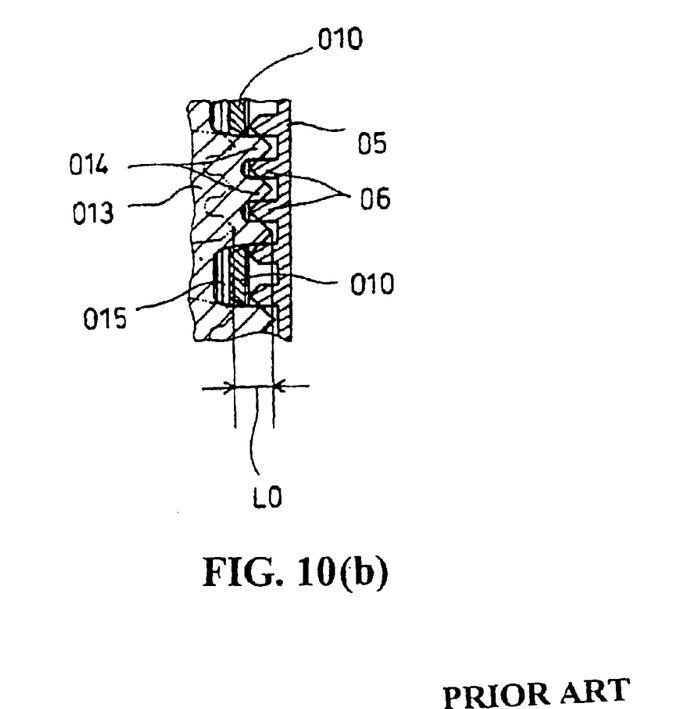

As a transmission of this type, for example, a constant-mesh transmission disclosed in Japanese Patent Publication No. Hei-2-39660, is known. A transmission 01 has, as shown in FIGS. 9 and 10, a transmission gear 03 formed integrally with a main shaft 02, and a transmission gear 05 which meshes with the gear 03 and is rotably provided for a counter shaft 04. In the transmission gear 05, a recess 07 is formed having a bottom in which a plurality of nails 06 are formed at intervals in the circumferential direction. A synchronizer ring 08 constructing a synchronizing mechanism in teamwork with the recess 07 is assembled in the recess 07 so as to be relative to the transmission gear 05. In the synchronizer ring 08, a plurality of openings 09 are formed at intervals in the circumferential direction, and an arm 010 having a chamfer 011 is formed between two neighboring openings 09. In a transmission gear 013 (slider) provided for the counter shaft 04 so as to be slidable in the axial direction and moved by a shift fork 012, nails 014 are formed at intervals in the circumferential direction, which can be inserted into the openings 09.

As shown in FIG. 10(A), at the time of changing speed, the transmission gear 013 moved by the shift fork 012 moves the synchronizer ring 08 via a synchronizer spring 015 from a speed change start position, thereby allowing a tapered face 016 of the synchronizer ring 08 to come into contact with a tapered face 017 of the second gear 05, and thus generating a frictional torque. This causes a chamfer 018 of the nail 014 and the chamfer 011 of the arm 010 to come into contact with each other. When the transmission gear 013 further presses the synchronizer ring 08, the transmission gears 013 and 05 are synchronized with each other via the synchronizer, ring 08, with a high frictional torque generated on both the tapered faces 016 and 017.

As shown in FIG. 10(B), after completion of synchronization of both of the gears 013 and 05, the transmission gear 013 is further moved in the axial direction, the nails 014 mesh with the nails 06 formed on the bottom of the recess 07, and the speed changing operation is completed.

In the conventional technique, the nails 014 of the transmission gear 013 as a slider moves in the axial direction. First, nails 014 come into contact with the chamfers 011 of the arms 010 with respect to the arms 010 and nails 06 positioned in a straight line in the axial direction and are inserted into the openings 09. Subsequently, nails 014 mesh with the nails 06 of the transmission gear 05. Therefore, a movement stroke LO in the axial direction of the transmission gear 013 from the speed change start position to the speed change completion position is long. This is one of the factors causing an increase in the size in the axial direction of the transmission 01. In the case of shortening the movement stroke LO, the width in the axial direction of the arm 010 having the chamfer 011 is narrowed, so that it becomes difficult to assure sufficient rigidity of the arms 010 of the synchronizer ring 08 pressed in the axial direction by the nails 014.

SUMMARY AND OBJECTS OF THE INVENTION

It is an object of the present invention to realize minimization in the axial direction of a constant-mesh transmission having a synchronizing mechanism and to achieve high rigidity of a synchronization spline formed in a synchronizer ring. Another object of the invention is to prevent an increase in size of the radial direction of a synchronizing mechanism.

The invention is directed to a constant-mesh transmission comprising a first gear provided for a first rotary shaft as to rotate integrally with the first rotary shaft, a second gear which meshes with the first gear and is rotatably provided for a second rotary shaft, and a synchronizing mechanism. The synchronizing mechanism includes a shifter provided for the second rotary shaft so as to rotate integrally with the second rotary shaft and to be movable in the axial direction, ring-shaped recess formed in the first gear, and a synchronizer ring disposed in the recess so as to be rotatable relative to the second gear and pressed by the shifter at the time of changing speed to move in the axial direction so as to come into frictional engagement with the first gear, thereby achieving synchronization between the shifter and the first gear.

In turn, the shifter include a first connection spline formed in a circumferential wall face of the recess and a first synchronization spline formed in a circumferential face of the synchronizer ring occupying a position where they at least partly overlap with each other in the axial direction. The shifter also includes a second connection spline which can mesh with the first connection spline and a second synchronization spline which presses the first synchronization spline in the axial direction to make the synchronizer ring and the first gear come into frictional engagement with each other, and can mesh with the first synchronization spline. At the time of changing speed, the first and second synchronization splines mesh with each other, after which the first and second connection splines mesh with each other.

According to the present invention, at the time of changing speed, the second synchronization spline of the shifter presses the first synchronization spline of the synchronizer ring, the synchronizer ring is moved in the axial direction and comes into frictional engagement with the first gear, thereby achieving synchronization between the shifter and the first gear. After completion of the synchronization, the first and second synchronization splines mesh with each other, and then the first and second connection splines mesh with each other, whereby the speed changing operation is completed.

As a result, the following effect is produced: Specifically, the first connection spline and the first synchronization spline have an overlap portion where they overlap with each other at least partly in the axial direction. Consequently, the movement distance of the shifter until completion of the sped changing operation is minimized, since the synchronizer ring is moved in the axial direction by the shifter, and the synchronizer ring and the first gear come into frictional engagement with each other to achieve synchronization between the shifter and the first gear. Then, after completion of the synchronization, the first and second synchronization splines mesh with each other. Finally, the first and second connection splines mesh with each other. With the configuration of the present invention, the movement stroke becomes shorter than with conventional configurations. It becomes possible to reduce the width in the axial direction of the first gear in which the recess is formed and dispose the first gear and the shifter so as to be closer to each other in the axial direction. Thus, the size of the transmission can be reduced in the axial direction.

Moreover, the first synchronization spline pressed by the second synchronization spline occupies a position where it overlaps with the first connection spline at least partly in the axial direction. As compared with the case where the first synchronization spline and the first connection spline are positioned without being overlapped in the axial direction, the width in the axial direction of he first synchronization spline can be increased and the rigidity of the first synchronization n spline against the pressing force acting from the second synchronization spline can be increased. This can be accomplished without increasing the width in the axial direction of the recess in which the synchronizer ring is disposed, and without increasing the width in the axial direction of the first gear in which the recess is formed.

According to another aspect of the present invention, a ring-side tapered portion is formed on the side opposite to the shifter in the axial direction for the first synchronization spine in the circumferential face of the synchronizer ring, and a gear-side tapered portion, with which the ring-side tapered portion comes into frictional engagement at the time of changing speed, is formed in a circumferential wall face of the recess.

With this feature, the following effect is produced: Specifically, in the synchronizer ring, the tapered portion is provided on the side opposite to the side where the shifter is positioned in the axial direction for the first synchronization spline. Thus, the first synchronization spline and the tapered portion are not parallel to each other in the axial direction, which otherwise would enlarge the synchronizing mechanism in the radial direction. Accordingly, the synchronizing mechanism having diameter can be assembled in a transmission gear.

In the specification, "axial direction" denotes a direction of rotation axis line of a rotary shaft of a constant-mesh transmission, and "radial direction" denotes a radial direction when the rotation axis line of the rotary shaft is used as a center.

Further scope of applicability of the present invention will become apparent detailed description given hereinafter. However, it should be understood that the detailed description and specific examples, while indicating preferred embodiments invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
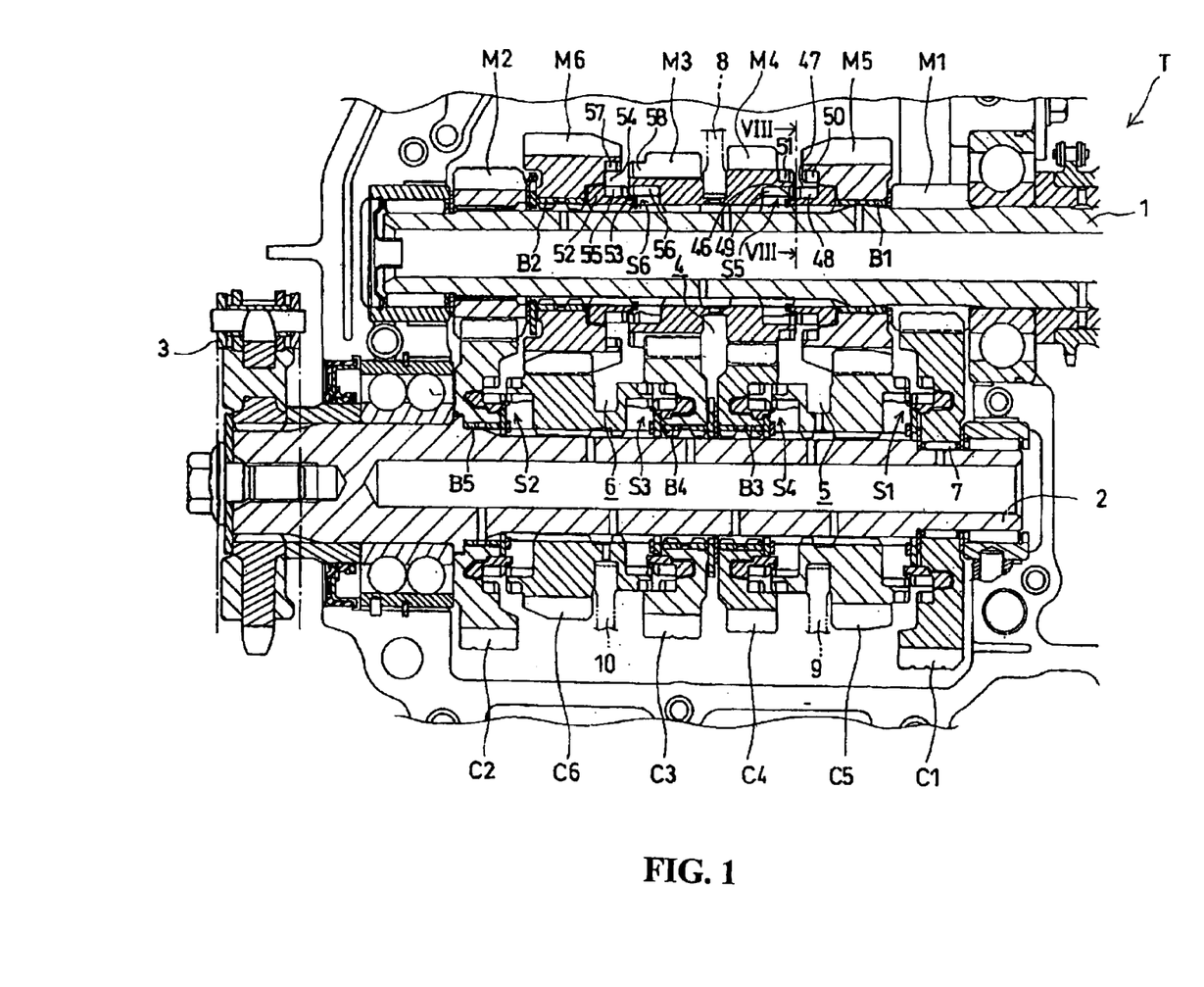
FIG. 1 is a cross section of a constant-mesh transmission for a motorcycle as an embodiment of the invention.

Referring to FIG. 1, a constant-mesh transmission T for a motorcycle to which the invention is applied has a main shaft 1, a counter shaft 2, a main transmission gear group provided for the main shaft 1, and a counter transmission gear group provided for the counter shaft 2. The power of a crankshaft of an internal combustion engine mounted on the motorcycle is transmitted to the main shaft 1 via a primary speed-reducing mechanism and a transmission clutch provided at one of ends (right end in FIG. 1) of the main shaft 1. From the counter shaft 2, the power after transmission obtained by engagement between the main transmission gear group and the counter transmission gear group is transmitted to rear wheels as driving wheels via a secondary speed-reducing mechanism having a transmission chain 3 provided at the other end of the counter shaft 2 (the left end in FIG. 1).

The main transmission gear group is constructed by, arranged in order from the transmission clutch side, a first gear M1, a fifth gear M5, a fourth gear M4, a third gear M3, a sixth gear M6, and a second gear M2. Similarly, the counter transmission gear group is constructed by, arranged in order from the transmission clutch side, a first gear C1, a fifth gear C5, a fourth gear C4, a third gear C3, a sixth gear C6, and a second gear C2. These counter transmission gears are positioned to mesh with the corresponding transmission gears of the main transmission gear group.

The main transmission gear group is provided for the main shaft 1 as follows: The first gear M1 is integrally formed with the main shaft 1, and the fifth gear M5 is rotatably attached to the main shaft 1 via a collar B1. The fourth and third gears M4 and M3 are integrally formed to construct a third/fourth gear, splined to the main shaft 1, and attached so as to be movable in the axial direction and rotatable together with the main shaft 1. In the third/fourth gear, an annular-shaped engagement groove 4, with which a shift fork 8 which will be described hereinafter engages, is formed between the fourth and third gears M4 and M3. Further, the sixth gear M6 is rotatably attached to the periphery of the main shaft 1 via a collar B2 to be splined, and the second gear M2 is splined to the main shaft 1 and attached so as to rotate integrally with the main shaft 1.

In a like manner, the counter transmission gear group is provided for the counter shaft 2 as follows: The first gear C1 is rotatably attached to the counter shaft 2 via a needle bearing 7. The fifth gear C5 is splined to the counter shaft 2 and attached so as to be movable in the axial direction and rotatable integrally with the counter shaft 2. The fourth and third gears C4 and C3 are rotatably attached to the counter shaft 2 via collars B3 and B4, respectively, splined to the counter shaft 2. The sixth gear C6 is splined to the counter shaft 2 and attached so as to be slidable in the axial direction and rotatable integrally with the counter shaft 2. The second gear C2 is rotatably attached to the periphery of the counter shaft 2 via the collar B5. Annular-shaped engagement grooves 5 and 6, with which shift forks 9 and 10 engage, are provided in the fifth and sixth gears C5 and C6, respectively. Further, synchronizing mechanisms S1 to S6 are provided by neighboring pairs of gears in the axial direction as follows: between the first and fifth gears C1 and C5, between the second and sixth gears C2 and C6, between third and sixth gears C3 and C6, between the fourth and fifth gears C4 and C5, between the fifth and fourth gears M5 and M4, and between sixth and third gears M6 and M3. These will be described below.

The shift forks 8 to 10 operated by a transmission lever so as to be movable in the axial direction are fit, respectively, in the engagement grooves 4 to 6 of the third/fourth gear, the fifth gear C5, and the sixth gear C6. By the movement in the axial direction of the shift forks 8 to 10, in the main shaft 1 and counter shaft 2, the synchronizing mechanism S1 to S6 operate. Therefore, the third/fourth gear, fifth gear C5, and sixth gear C6 construct a shifter.

Figure 2:
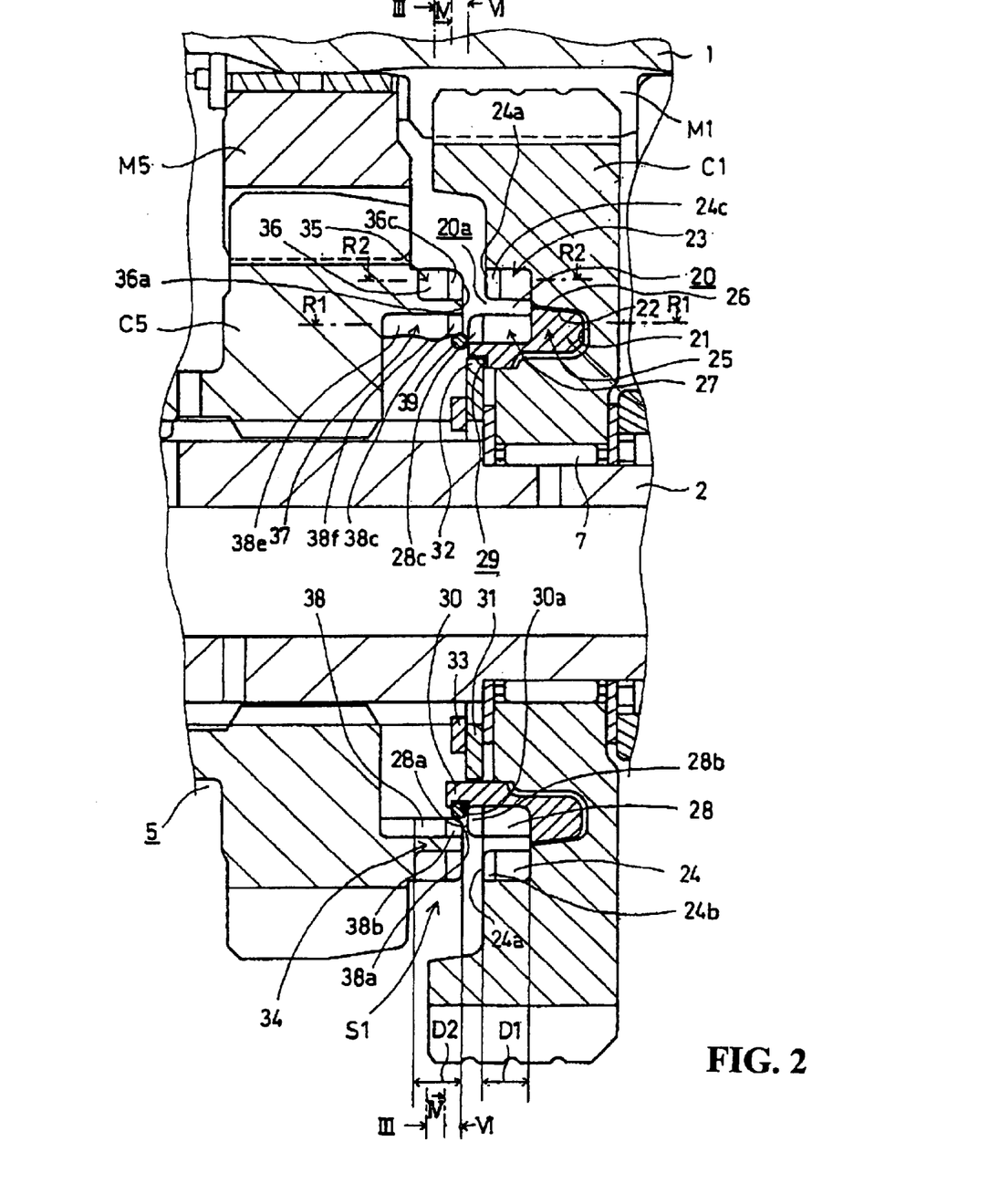
FIG. 2 is an enlarged view of the main portion of FIG. 1.
Figure 3:
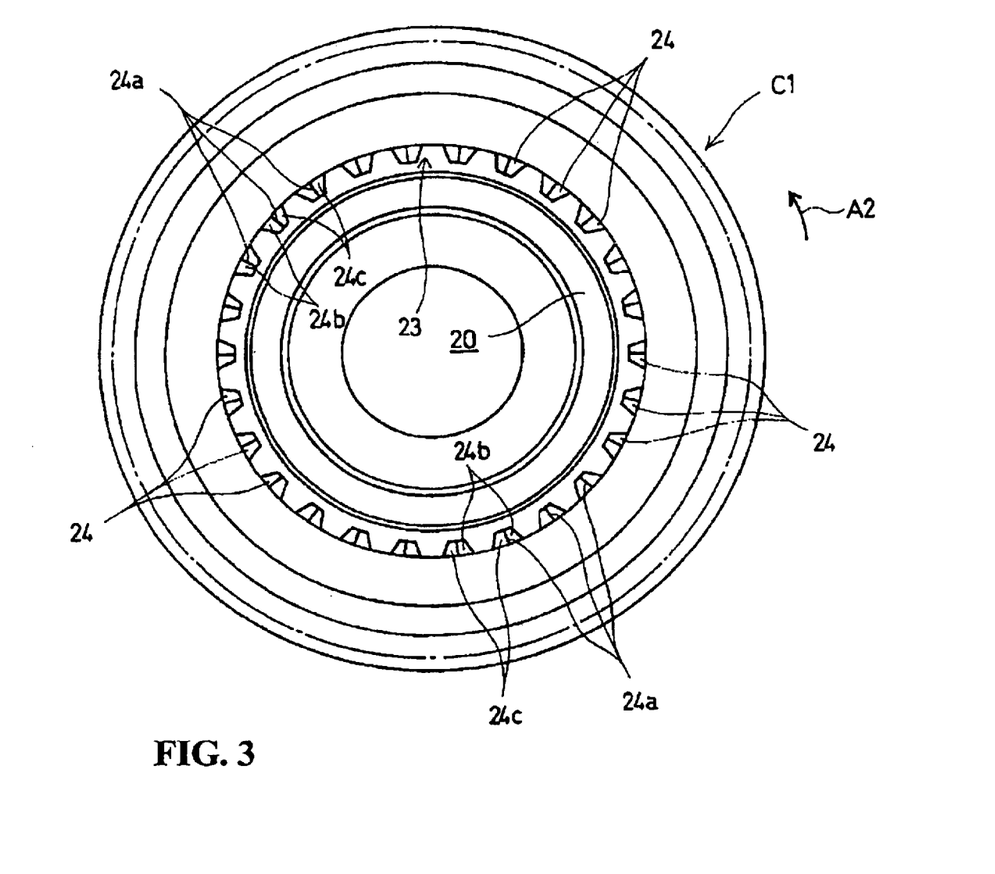
FIG. 3 is a view of a first gear taken along line III—III of FIG. 2.

With reference mainly to FIG. 2, the synchronizing mechanism S1 provided between the first and fifth gears C1 and C5 will be described below. The synchronizing mechanism S1 includes a recess 20 formed in the first gear C1, a synchronizer ring 25 disposed rotatably relative to the first gear C1 in the recess 20, the fifth gear C5 as a shifter, an index washer 31 as a synchronization positioning member, and a synchronizer spring 39 as an intermediate member for transmitting a press force in the axial direction of the fifth gear C5 to the synchronizer ring 25.

Figure 7A:
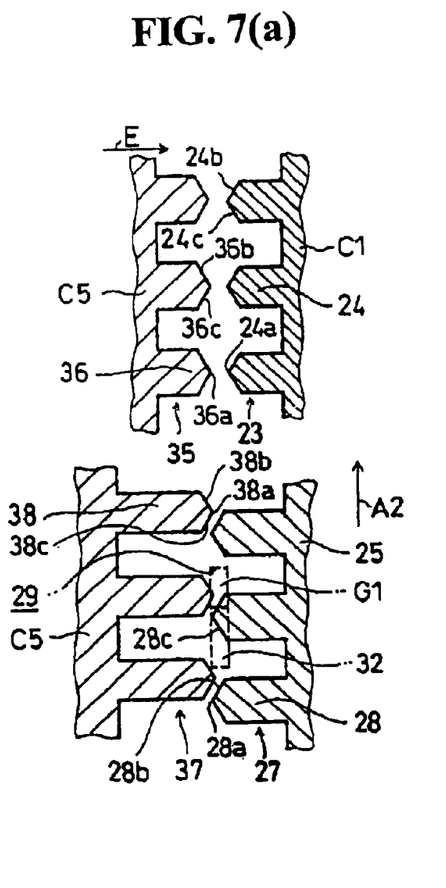
FIGS. 7(A)–7(D) are diagrams illustrating the action of a synchronizing mechanism of a transmission of FIG. 1, with each diagram showing a cross section taken along line R1—R1 in the circumferential direction of FIG. 2, and a cross section taken along line R2—R2.

Referring now to FIG. 2, the annular-shaped recess 20, which is concentric with the counter shaft 2, is form in an end face of the first gear C1 in the axial direction opposite to the fifth gear C5 side, so as to have an opening 20a which opens toward the fifth gear C5 in the axial direction. A tapered portion 22 of the recess 20 has a conical face positioned near the bottom face 21 in the axial direction and inclined outwardly in the radial direction from the bottom face 21 toward the opening 20a, and a first connection spline 23 positioned near the opening 20a in the axial direction more than the tapered portion 22 and positioned on an outer side in the radial direction more than the tapered portion 22, are form d in the external wall face of the recess 20. The first connection spline 23 has a number of teeth 24 which are lined to the first gear C1 on the bottom face 21 side and on the outer side in the radial direction. As shown in FIG. 7, a tip 24a of each of the teeth 24a in the axial direction is formed by a pair of chamfers 24b and 24c as tapered faces facing in the circumferential direction.

Figure 4:
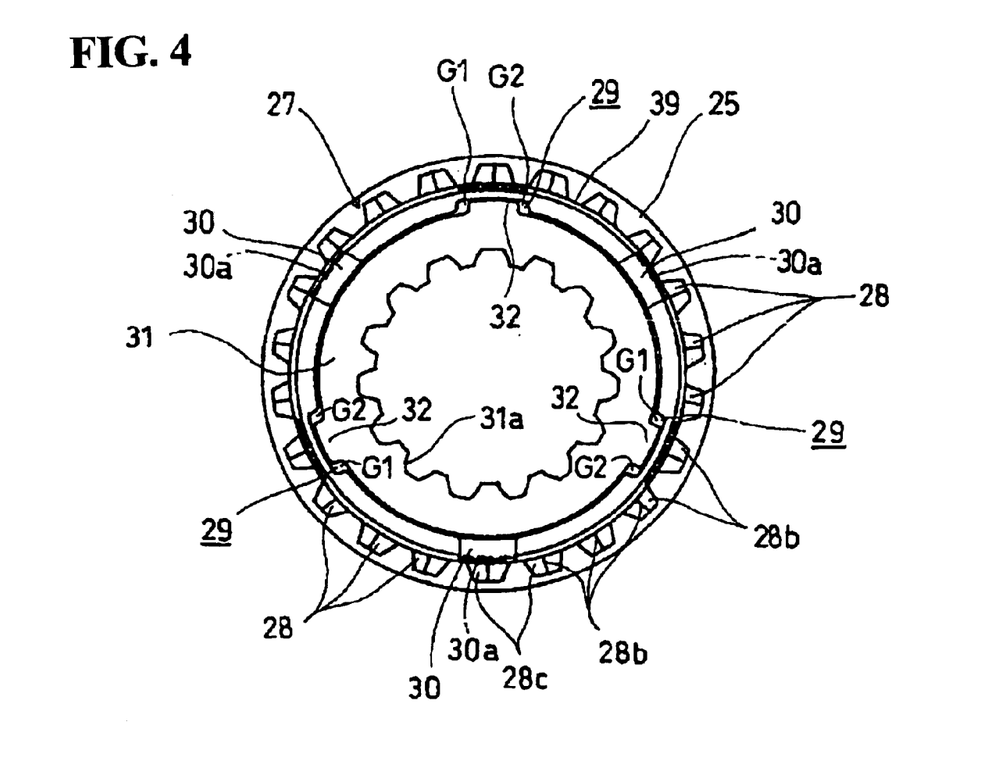
FIG. 4 is a view of a synchronizer ring and an index washer taken along line IV—IV of FIG. 2.

Referring now to FIGS. 2 and 4, a tapered portion 26 of the synchronizing ring 25 has a conical face, which comes into frictional engagement with the tapered portion 22 of the recess 20 at the time of the synchronizing operation, and a first synchronization spline 27 formed on the outer circumferential face of the annular synchronizer ring 25. The tapered portion 26 is formed on the side opposite to the side where the fifth gear C5 is formed in the axial direction for the first synchronization spline 27. The first synchronization spline 27 has a number of teeth 28, which are provided along the synchronizer ring 25 on the tapered portion 26 side in the axial direction and on the inside in the radial direction. A tip 28a in the axial direction of each tooth 28 is formed by, as specifically shown in FIG. 7, a air of chamfers 28b and 28c as tapered faces facing the circumferential direction.

Further, as shown in FIG. 2, the first synchronization spline 27 is positioned on the inside in the radial direction of the first connection spline 23 in a state where the synchronizer ring 25 is disposed the recess 20. The position of the tip 28a of the first synchronization spline 27 in the ax al direction is closer to the fifth gear C5 more than the tip 24a of the first connection spline 23. The first synchronization spline 27 has an overlap portion D1 which partially overlaps with the first connection spline 23. The width of the overlap portion D1 is properly set in consideration of the position in the axial direction of a tip 36a of a second connection spline 35, to be described later, when the transmission M is in a neutral state and the synchronizing mechanism S1 is in a not-operating position (which is also a speed change start position).

On the other hand, provided in the inner circumferential face of the synchronizer ring 25 are a plurality of notches 29, and holding portions are arranged. These include, for example, the three notches 29 as engagement portions for positioning in the circumferential direction, each having a predetermined length provided at equal intervals in the circumferential direction toward the end face in the axial direction near the fifth gear C5 and, for example, three holding portions 30 arranged at equal intervals in the circumferential direction so as to position between the notches 29. Each of the holding portions 30 is projected in the axial direction and has a groove 30a (see FIG. 2) in the outer face in the radial direction. The synchronizer spring 39 is fit and held in the groove 30a.

The index washer 31 is splined to the counter shaft 2 by a spline 31a provided on the inner peripheral face of the index washer 31 and rotates integrally with the counter shaft 2. In the outer circumferential face of the index washer 31, projections 32 serve as engagement portions for positioning in the circumferential direction of the same number as that of the notches 29. The projections 32 fit in the notches 29 and are formed at intervals in the circumferential direction corresponding to the intervals in the circumferential direction of the notches 29. In a state where the projections 32 are arranged in the center position in the circumferential direction of the notch 29, a gap G1 and a gap G2 (see FIG. 4) are formed in the circumferential direction between the end in the circumferential direction of the projections 32 and the end in the circumferential direction of the notch 29.

Figure 5:
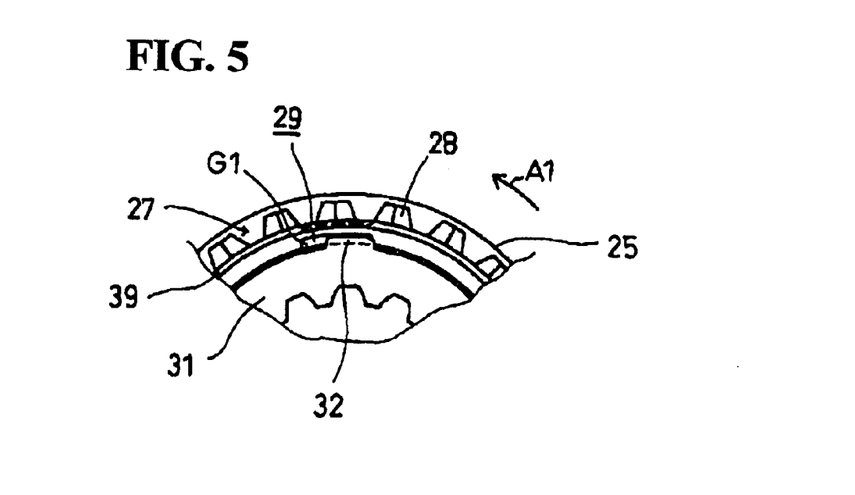
FIG. 5 is a view taken in a manner similar to FIG. 4 of a main portion showing a state where the synchronizer ring and the index washer are positioned in the direction of rotation.

Therefore, the synchronizer ring 25 can rotate relative to the index washer 31 within the range of the gaps G1 and G2. The length in the circumferential direction of each of the gaps G1 and G2 is set so that the chamfer 28b (28c) of the first synchronization spline 27 and the chamfer 38c (38b) of the second synchronization spline 37, which will be described hereinafter, are in position facing each other in the axial direction (see to FIG. 7A), for example, as shown in FIG. 5. In this state, the synchronizer ring 25 rotates relative to the index washer 31 in the rotating direction A1 (or in the direction opposite to the rotating direction A1) and one of the ends in the circumferential direction (other end in the circumferential direction) of the notch 29 is in contact with one of the ends in the circumferential direction (other end in the circumferential direction) of the projections 32. Movement in the axial direction of the index washer 31 is checked by a circlip 33, thereby preventing the synchronizer ring 25 from moving in the axial direction and from being come off from the recess 20.

Referring now to FIGS. 6 and 7(A)–(D), annular projections 34 are formed concentrically with the counter shaft 2 in the end face of the fifth gear C5 on the first gear C1 side in the axial direction. As seen in FIGS. 7(A)–(D), the second connection spline 35, which can mesh with the first connection spline 23, is formed in the outer circumferential face of the projections 34 (see FIG. 6). The second connection spline 35 has a number of teeth 36. The base portions of the teeth 36 are provided on the inner side in the radial direction and along the fifth gear C5 in the axial direction, and tips 36a in the axial direction are formed by pairs of chamfers 36b and 36c as tapered faces facing in the circumferential direction.

Figure 6:
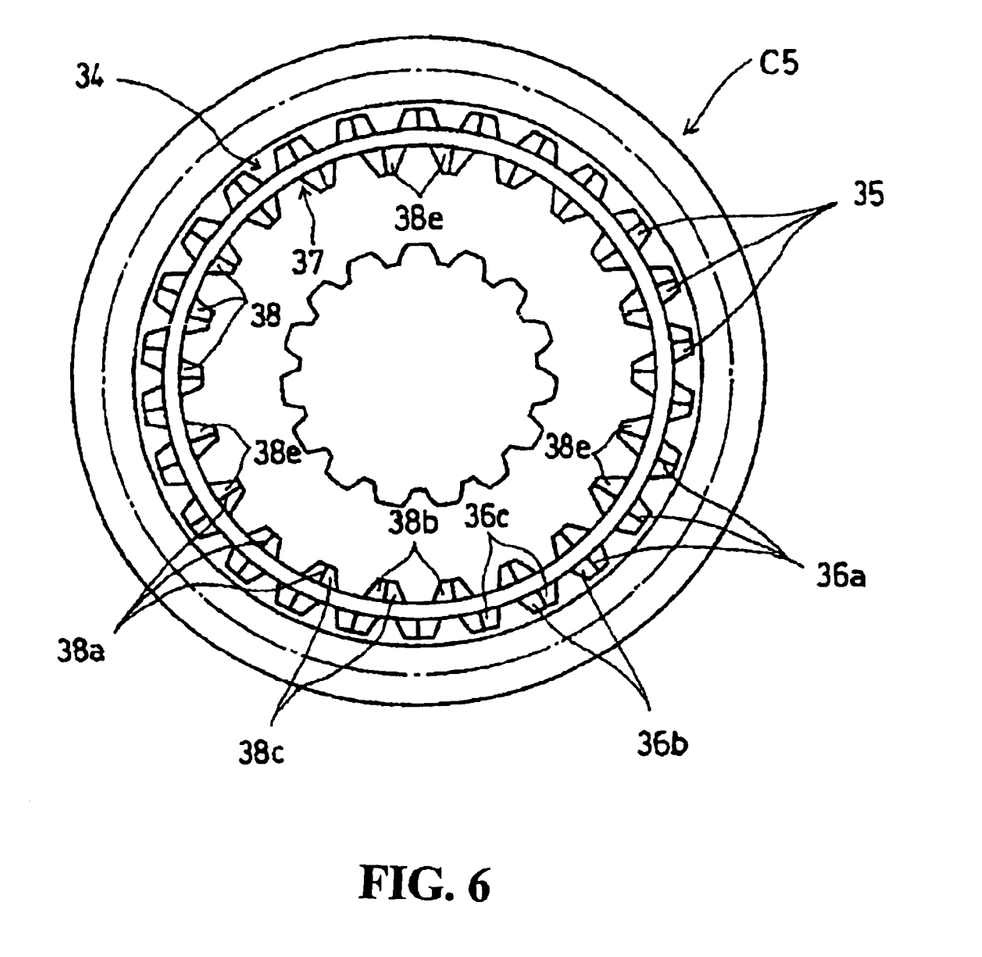
FIG. 6 is a view of a fifth gear taken along line VI—VI of FIG. 2.

FIG. 7(A) shows a second synchronization spline 37 is formed in the inner circumferential face of the projections 34 (see FIG. 6). The second synchronization spline 37 is positioned on the inner side in the radial direction of the second connection spline 35 and can mesh with the first synchronization spline 27. The second synchronization spline 37 has a number of teeth 38. The base portions of the teeth 38 are provided in a line along the fifth gear C5 on the outer side in the radial direction and the axial direction, and the tip 38a in the axial direction is formed by a pair of chamfers 38b and 38c as tapered faces facing in the circumferential direction. Further the tip 38a of the second synchronization spline 37 occupies the same position in the axial direction as the tip 36a of the second connection spline 35. The second synchronization spline 37 has an overlap portion D2 which partially overlaps with the second connection spline 35 in the axial direction.

Two of the teeth 38 of the second synchronization spline 37, namely the teeth 38e occupying the position corresponding to the outer side in the radial direction of each projection 32 of the index washer 31, have a contact portion 38f (see FIG. 2) which comes into contact with the synchronizer spring 39 in a state where the fifth gear C5 and index washer 31 are splined to the counter shaft 2. When the fifth gear C5 is moved toward the first gear C1 by the shift fork 9 to start the synchronizing work of the synchronizing mechanism S1, these two teeth 38e press the synchronizer spring 39 in the axial direction. Further, the synchronizer spring 39 presses the synchronizer ring 25 so as to be moved in the axial direction. By the movement of the synchronizer ring 25, both of the tapered portions 22 and 26 come into frictional engagement with each other.

Further, with reference to FIG. 4, the synchronizer spring 39 is formed by warping a wire made of spring steel in a circular ring shape so that it can be elastically deformed in the radial direction. Synchronizer spring 39 is held in a position in the radial direction in which the contact portion 38f of each of the teeth 38e of the second synchronization spline 37 comes into contact with the holding portion 30 of the synchronizer ring 25 and in the axial direction closer to the fifth gear C5 more than the first synchronization spline 27.

With reference to FIGS. 2 and 7(A)–(D), the action of the synchronizing mechanism of the transmission T will be described in relation to a speed-changing operation to the first speed at the time of start. It is assumed that the rotating direction of the counter shaft 2 is a direction shown by the arrow A2 in the drawing.

First, after the internal combustion engine is started, the transmission clutch is connected to the transmission T, which is in a neutral state to rotate the main shaft 1. The first gear C1, which rotates integrally with the main shaft 1, rotates relative to the stopped counter shaft 2. At this time, the synchronizing mechanism S1 is in a state shown in FIG. 2. Between the first and second synchronization splines 27 and 37 and between the first and second connection splines 23 and 35, gaps in the axial direction are formed, so that the splines are apart from each other.

Figure 7B:
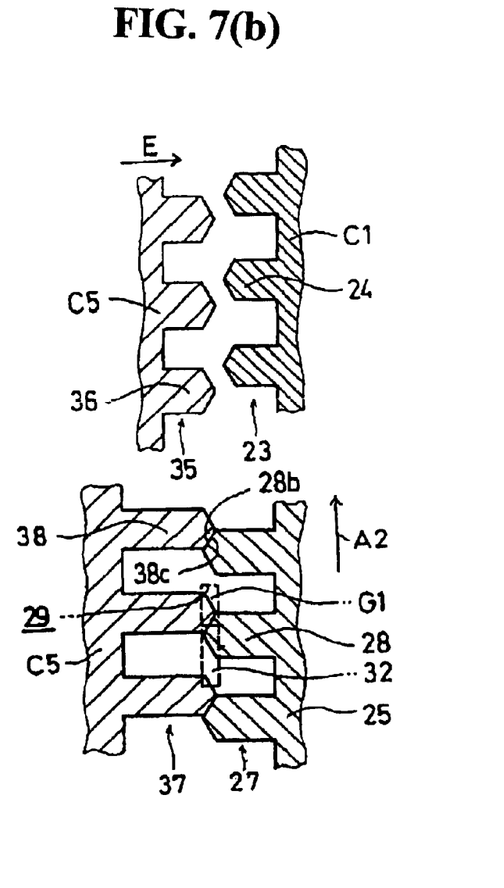

FIGS. 7(A)–7(D) are diagrams illustrating the synchronizing mechanism of the transmission of FIG. 1. Each of the diagrams FIGS. 7(A)–7(B) shows a cross section taken along line R1—R1 in the circumferential direction of FIG. 2, and a cross section taken along line R2—R2.

Looking at FIG. 7(A), it can be seen that after the transmission clutch is disengaged, the transmission level is operated and the shift fork 9 moves the fifth gear C5 in the speed changing operation direction E, the teeth 38e having the contact portions 38f of the second synchronization spline 37 of the fifth gear C5 press the synchronizer ring 25 via the synchronizer spring 39 toward the first gear C1 in the speed-changing operation direction E. By this operation, the tapered portion 26 of the synchronizer ring 25 and the tapered portion 22 of the recess 20 of the first gear C1 come into frictional engagement with each other. By a friction torque generated by the tapered portions 22 and 26, the synchronizer ring 25 rotates in the same direction as the first gear C1 and rotates relative to the index washer 31 until the projection 32 comes into contact with one of the ends of the notch 29 in the range of the gap G2 (see FIG. 4) as shown in FIG. 7(A). The fifth gear C5 and the synchronizer ring 25 are positioned in the rotation direction A2 so that the chamfer 38c as a rear portion in the rotation direction A2 of each of the teeth 38 of the second synchronization spline 37 and the chamfer 28b as a front portion in the rotation direction A2 of the corresponding tooth 28 in the first synchronization spline 27 face each other in the axial direction.

Now looking at FIG. 7(B), it can be seen that when the fifth gear C5 is further moved in the speed-changing operation direction E by the shift fork 9, the friction force between the tapered portions 22 and 26 gradually increases, and the chamfer 38c of each of the teeth 38 of the second synchronization spline 37 occupies the position to come into contact with the chamfer 28b of each of the teeth 28 of the first synchronization spline 27. At this time, the synchronizer spring 39 is warped inwardly in the radial direction by the elevated contact portion 38f and does not press the synchronizer ring 25 in the axial direction by further movement of the fifth gear C5 in the speed-changing operation direction E.

When an attempt is made to further move the fifth gear C5 in the speed-changing operation direction E via the chamfers 28b and 38c which are in contact with each other, the tapered portion 26 presses the tapered portion 22 more strongly.

Consequently, a large friction torque acts between the tapered portions, and further movement in the speed-changing operation direction E of the fifth gear C5 is checked by a reaction force from the chamfer 28b of the synchronizer ring 25. In this state, the speed of the first gear C1 is decelerated, and synchronization between the fifth gear C5 and the first gear C1 is achieved. Since this case relates to the speed-changing operation at the time of start of a motorcycle, the fifth gear C5 is in a stopped state.

After completion of the synchronization of the fifth gear C5 and the first gear C1 (in this case, the first gear C1 stops in a manner similar to the fifth gear C5), no friction torque is generated between the tapered portions 22 and 26, so that the transmission torque based on the friction torque between the chamfers 28b and 38c does not exist. Consequently, when the teeth 28 of the fifth gear C5 properly press the teeth 28 of the first synchronization spline 27 by the operation of the transmission lever, the fifth gear C5 is moved in the speed-changing operation direction E. Concurrently, the synchronizer ring 25 rotates relative to the fifth gear C5 until the gap G2 is formed (refer to FIG. 4), the teeth 38 of the second synchronization spline 37 start to be engaged with the teeth 28 of the first synchronization spline 27, and the first and second synchronization splines 27 and 37 mesh with each other.

Figure 7C:
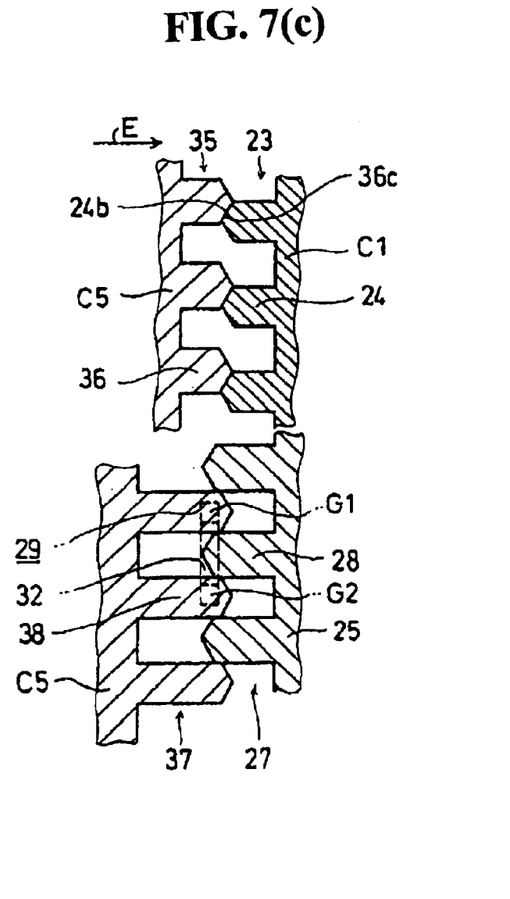

As shown in FIG. 7(C), when the fifth gear C5 is further moved in the speed-changing operation direction E, so that the first and second synchronization splines 27 and 37 mesh with each other, the chamfers 24b and 36c of the first and second connection splines 23 and 35 come into contact with each other.

Figure 7D:
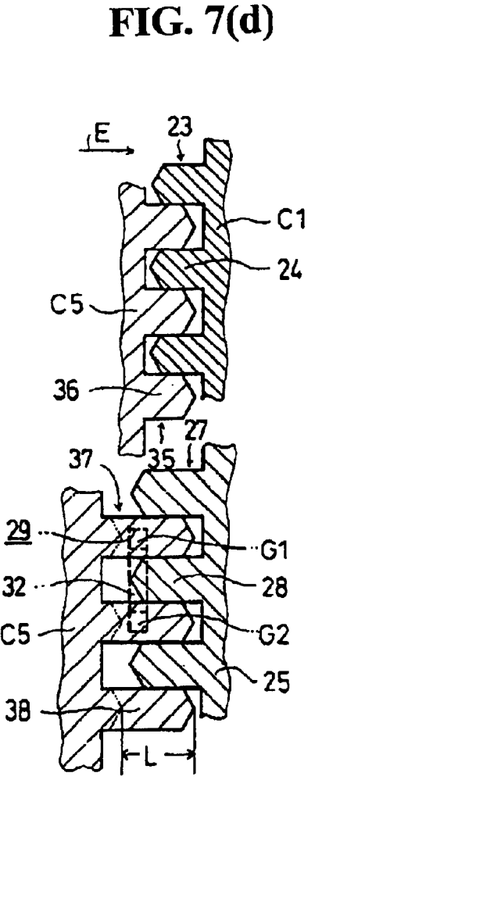

Finally, as shown in FIG. 7(D), when the fifth gear C5 is further moved in the speed-changing operation direction E, relative rotation occurs between the fifth gear C5 and the first gear C1 (at the time of start, since the fifth gear C5 is stopped, the first gear C1 rotates), the first and second connection splines 23 and 35 mesh with each other, and the speed change to the first speed is completed. Consequently, the movement stroke L in the axial direction of the fifth gear C5 from the speed change start position to the speed change completion position is shorter than that in the case where the first synchronization spline 27 and the first connection spline 23 do not overlap with each other in the axial direction.

After that, the transmission clutch is connected, and the motorcycle drives at the first speed. In the case of canceling the driving at the first speed, it is sufficient to operate the transmission lever to move the fifth gear C5 in the direction opposite to the speed-changing operation direction F by the shift fork 9, thereby disengaging the first and second connection splines 23 and 35 and the first and second synchronization splines 27 and 37.

Further, each of the synchronizing mechanisms S2 to S4 has components similar to those of the synchronizing mechanism S1. Consequently, speed change to the second, third, and fourth speeds is performed by operation of the synchronizing mechanisms S2 to S4 in a manner similar to the synchronizing mechanism S1 by using the fifth gear C5 and sixth gear C6 as a shifter, which are moved by the shift forks 9 and 10.

Figure 8:
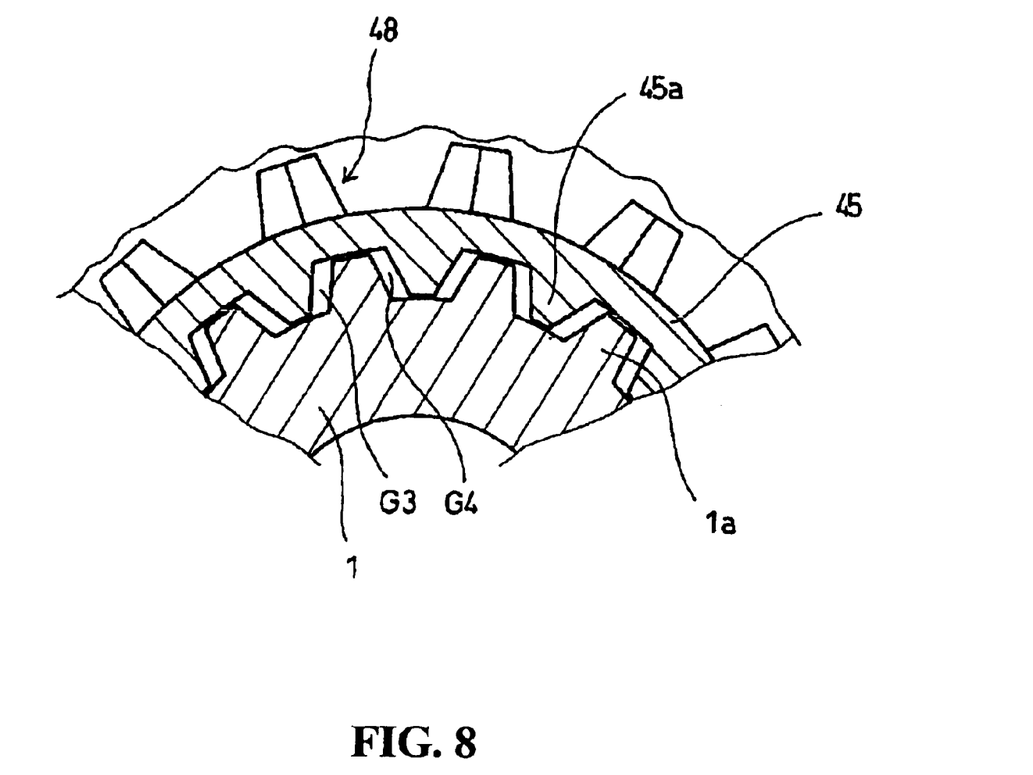
FIG. 8 is a view taken along line VIII—VIII of FIG. 1 of a synchronizer ring.

The index washer 31 is not provided for each of the synchronizing mechanisms S5 and S6. As shown in FIG. 8, gaps G3 and G4 in the circumferential direction, corresponding to the gaps G1 and G2 in the synchronizing mechanism S1, are formed between a spline 1a formed in the main shaft 1 and a spline 45a of a synchronizer ring 45. By the gaps G3 and G4, positioning is made in the rotation direction at the time of start of synchronization. At the time of changing the speed to the fifth speed, referring to FIG. 1, the third/fourth gear is moved in the speed-changing operation direction (to the right in FIG. 1) by the shift fork 8, and a synchronizer spring 46 presses the synchronizer ring 45. Consequently, the tapered portion of the synchronizer ring 45 and the tapered portion of a recess 47 formed in the fifth gear M5 come into frictional engagement with each other. First and second synchronization splines 48 and 49 for starting synchronization are positioned in the rotation direction. After that, the first and second synchronization spines 48 and 49 mesh with each other, the first and second connection splines 50 and 51 mesh with each other, and the speed-changing operation is completed.

At the time of changing the speed to the sixth speed, the third/fourth gear is moved by the shift fork 8 in the speed-changing operation direction (to the left in FIG. 1), so that a synchronizer spring 53 presses a synchronizer ring 52. Consequently, the tapered portion of the synchronizer ring 52 and the tapered portion of a recess 54 formed in the sixth gear M6 come into frictional engagement with each other, thereby performing positioning for starting synchronization. First and second synchronization splines 55 and 56 mesh with each other; further, first and second connection splines 57 and 58 mesh with each other, and the speed-changing operation is completed.

The action and effect of the embodiment above will now be described. Although the synchronizing mechanism S1 will be used in this description, the other synchronizing mechanisms S2 to S6 are similar to the synchronizing mechanism S1.

At the time of changing the speed, the fifth gear C5, also serving as a shifter, moves the synchronizer ring 25 in the axial direction via the synchronizer spring 39 so that, initially, the synchronizer ring 25 and the first gear C1 come into frictional engagement with each other in the tapered portions 26 and 22, positioning between the fifth gear C5 and the synchronizer ring 25 in the rotation direction of the counter shaft 2 is performed, and the synchronizing operation is started. Subsequently, the chamfer of the second synchronization spline 37 comes into contact with the chamfer of the first synchronization spline 27 to thereby press the synchronizer ring 25. Consequently, a large friction torque is generated by the frictional engagement between the tapered portions 22 and 26, and the fifth gear C5 and the first gear C1 are synchronized with each other.

After achieving synchronization between the fifth gear C5 and the first gear C1, the first and second synchronization splines 27 and 37 mesh with each other. Next, the first and second connection splines 23 and 35 mesh with each other, and the speed changing operation is completed. At this time, the first connection spine 23 and the first synchronization spline 27 overlap by distance D1 in the axial direction. Consequently, the movement distance of the shifter, that is the movement stroke L, from the start of speed changing to completion of speed changing, becomes shorter. As compared to the prior art, it is possible to reduce the width in the axial direction of the first gear C1 in which the recess 20 is formed and dispose the first gear C1 and the fifth gear C5 closer to each other in the axial direction. Thus, the size of the transmission T can be reduced in the axial direction.

Moreover, the chamfers of the first and second synchronization splines 27 and 37 come into contact with each other, and the first synchronization spline 27 pressed by the second synchronization spline 37 occupies the position where it partly overlaps with the first connection spline 23 in the axial direction.

Therefore, as compared with the case where the first synchronization spline 27 and the first connection spline 23 are positioned without being overlapped in the axial direction, the width in the axial direction of the first synchronization spline 27 can be increased, and the rigidity of the first synchronization spline 27 against the pressing force acting from the second synchronization spline 37 of the fifth gear C5 can be increased. This increased rigidity can be achieved without increasing the width in the axial direction of the recess 20 in which the synchronizer ring 25 is disposed and without increasing the width in the axial direction of the first gear C1 in which the recess 20 is formed.

In the synchronizer ring 25, the tapered portion 26 is provided on the side opposite to the side where the fifth gear C5 is positioned in the axial direction for the first synchronization spline 27. Thus, since the first synchronization spline 27 and the tapered portion 26 are not provided in parallel to each other in the axial direction, it is possible to prevent an increase in the size of the synchronizing mechanism S1 in the radial direction. Accordingly, the synchronizing mechanism can be assembled also in a transmission gear having a small diameter such as the third gear and the fourth gear of the main shaft 1 and the counter shaft 2.

The teeth 28 of the first synchronization spline 27 are formed so as to line along the synchronizer ring 25 in the axial direction and on the inside in the radial direction, and particularly along the synchronizer ring 25 in the axial direction. The fifth gear C5 is then moved further in the speed-changing operation direction to make the tapered portion 26 press the tapered portion 22 more strongly in a state where the chamfer of the second synchronization spline 37 is in contact with the chamfer of the first synchronization spline 27. As a result, rigidity and strength can be assured sufficient to receive the press force in the axial direction acting on the first synchronization spline 27 from the second synchronization spline 37.

Further, in the synchronizing mechanisms S5 and S6, by using tie gaps G3 and G4 formed between the spline 1A formed in the main shaft 1 and the splines of the synchronizer rings 45 and 52, positioning is performed in the rotation direction at the start of synchronizing operation between the third/fourth gear and synchronizer rings 45 and 52. Consequently, the index washer becomes unnecessary, the number of parts is reduced, and the structure of the synchronizing mechanism is simplified.

Embodiments each obtained by modifying the configuration of a part of the foregoing embodiment will be described below with respect to the modified configurations.

In the foregoing embodiment, the first and second synchronization splines and the first and second connection splines are formed in the whole circumference in the first to sixth gears M1 to M6 and C1 to C6 and the synchronizer ring. Alternately, a spline partially formed in the circumferential direction may be employed.

Although the first and second synchronization splines are provided on the inside in the radial direction of the first and second connection splines in the foregoing embodiment, the first and second synchronization splines may be provided on the outer side in the radial direction of the first and second connection splines. Although the tapered portion is formed in the outer circumferential face of the synchronizer ring, it maybe provided on the inner circumferential face. In this case, a tapered portion corresponding to the inner circumferential wall face of the recess 20 is provided.

Although the tip 28a of the first synchronization spline 27 is positioned closer to the fifth gear C5 (shifter) (left part in FIG. 2) in the axial direction than the tip 24a of the first connection spline 23 at the speed change start position in the foregoing embodiment, the tips 28a and 24a may occupy the same position in the axial direction. Also, the first connection spline 23 and the first synchronization spline 27 may be provided so as to be overlapped with each other as a whole in the axial direction. In this case, the tip 38a of the second synchronization spline 37 is provided so as to be positioned closer to the first gear C1 in the axial direction than the tip 36a of the second connection spline 35 (right part in FIG. 2).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A constant-mesh transmission comprising:

a first gear provided for a first rotary shaft so as to rotate integrally with the first rotary shaft;

a second gear which meshes with the first gear and is rotatably provided for a second rotary shaft; and a synchronizing mechanism, said synchronizing mechanism having a shifter provided for said second rotary shaft so as to rotate integrally with said second rotary shaft and to be movable in the axial direction, a ring-shaped recess formed in said first gear, and a synchronizer ring disposed in the recess so as to be rotatable relative to said second gear and pressed by said shifter at the time of changing speed to move in said axial direction so as to come into frictional engagement with said first gear, thereby achieving synchronization between said shifter and said first gear, wherein a first connection spline formed in a circumferential wall face of said recess and a first synchronization spline formed in a circumferential face of said synchronizer ring occupy positions where the first connection spline, the first synchronization spline, and the synchronizer ring at least partly overlap with each other in said axial direction, a second connection spline and a second synchronization spline are formed in said shifter, the second connection spline meshes with said first connection spline, and the second synchronization spline presses said first synchronization spline in said axial direction to make said synchronizer ring and said first gear come into frictional engagement with each other and meshes with said first synchronization spline, and at the time of changing speed, said first and second synchronization splines mesh with each other and, after that, said first and second connection splines mesh with each other.

2. The constant-mesh transmission according to claim 1, further comprising:

a ring-side tapered portion formed on the circumferential face of said synchronizer ring disposed on the side opposite to said shifter in said axial direction of said first synchronization spline; and a gear-side tapered portion formed in an circumferential wall face of said recess, the gear-side tapered portion coming into frictional contact with said ring-side tapered portion at the time of changing speed.

3. The constant-mesh transmission according to claim 1, wherein the synchronizing mechanism further comprises:

an index washer as a synchronization positioning member; and a synchronizer spring as an intermediate member for transmitting a press force in the axial direction of the second gear to the synchronizer ring.

4. The constant-mesh transmission according to claim 1, wherein a plurality of notches and holding portions are provided on an inner circumferential face of the synchronizer ring.

5. The constant-mesh transmission according to claim 1, wherein the first connection spline is formed in a whole circumference of the recess of the first gear and the second connection spline is formed in a whole circumference of the second gear.

6. The constant-mesh transmission according to claim 1, wherein the first and second connection splines are formed on only part of a whole circumference of the first and second gears.

7. The constant-mesh transmission according to claim 1, wherein the first and second synchronization splines are provided on the inside in the radial direction of the first and second connection spline.

8. The constant-mesh transmission according to claim 1, wherein the first and second synchronization splines are provided on the outer side in the radial direction of the first and second connection splines.

9. The constant-mesh transmission according to claim 2, wherein said ring-side tapered portion is formed in an outer circumferential face of the synchronizer ring.

10. The constant-mesh transmission according to claim 2, wherein said ring-side tapered portion is formed on an inner circumferential face of the synchronizer ring.

11. The constant-mesh transmission according to claim 1, wherein a tip of the first synchronization spline is positioned closer to the second gear in an axial direction than a tip of the first connection spline at the speed change start position.

12. The constant-mesh transmission according to claim 1, wherein a tip of the first synchronization spline occupies an equivalent position in the axial direction as a tip of the first connection spline at the speed change start position.

13. A constant-mesh transmission comprising:
   a first gear provided for a first rotary shaft so as to rotate integrally with the first rotary shaft;
   a second gear which meshes with the first gear and is rotatably provided for a second rotary shaft; and
   a synchronizing mechanism, said synchronizing mechanism having
      a shifter provided for said second rotary shaft so as to rotate integrally with said second rotary shaft and to be movable in the axial direction,
      a ring-shaped recess formed in said first gear, and
      a synchronizer ring disposed in the recess so as to be rotatable relative to said second gear and pressed by said shifter at the time of changing speed to move in said axial direction so as to come into frictional engagement with said first gear, thereby achieving synchronization between said shifter and said first gear,
      an index washer as a synchronization positioning member, and
      a synchronizer spring as an intermediate member for transmitting a press force in the axial direction of th second gear to the synchronizer ring,
   wherein a first connection spline formed in a circumferential wall face of said recess and a first synchronization spline formed in a circumferential face of said synchronizer ring occupy positions where the first connection spline, the first synchronization spline, and the synchronizer ring at least partly overlap with each other in said axial direction,
   a second connection spline and a second synchronization spline are formed in said shifter, the second connection spline meshes with said first connection spline, and the second synchronization spline presses said first synchronization spline in said axial direction to make said synchronizer ring and said first gear come into frictional engagement with each other and meshes with said first synchronization spline, and
   at the time of changing speed, said first and second synchronization splines mesh with each other and, after that, said first and second connection splines mesh with each other.

14. The constant-mesh transmission according to claim 13, further comprising:
   a ring-side tapered portion formed on the circumferential face of said synchronizer ring disposed on the side opposite to said shifter in said axial direction of said first synchronization spline; and
   a gear-side tapered portion formed in an circumferential wall face of said recess, the gear-side tapered portion coming into frictional contact with said ring-side tapered portion at the time of changing speed.

15. The constant-mesh transmission according to claim 13, wherein the first and second synchronization splines are provided on the inside in the radial direction of the first and second connection splines.

16. The constant-mesh transmission according to claim 13, wherein the first and second synchronization connection splines are provided on the outer side in the radial direction of the first and second connection splines.

17. The constant-mesh transmission according to claim 14, wherein said ring-side tapered portion is formed in an outer circumferential face of the synchronizer ring.

18. The constant-mesh transmission according to claim 14, wherein said ring-side tapered portion is formed on an inner circumferential face of the synchronizer ring.

19. The constant-mesh transmission according to claim 13, wherein a tip of the first synchronization spline is positioned closer to the second gear in an axial direction than a tip of the first connection spline at the speed change start position.

20. The constant-mesh transmission according to claim 13, wherein a tip of the first synchronization spline occupies an equivalent position in the axial direction as the tip of a first connection spline at the speed change start position.

* * * * *